United States Patent [19]
Peterson, II

[11] Patent Number: 4,855,608
[45] Date of Patent: Aug. 8, 1989

[54] LASER CURTAIN HAVING AN ARRAY OF PARABOLIC MIRRORS EACH FOCUSING RADIATION ON A CORRESPONDING DETECTOR POSITIONED IN MIRROR'S FOCAL POINT

[76] Inventor: William D. Peterson, II, 1444 Murphy's La., Salt Lake City, Utah 84106

[21] Appl. No.: 61,562

[22] Filed: Jun. 12, 1987

[51] Int. Cl.⁴ .................. G01N 21/86; G01V 9/04
[52] U.S. Cl. ..................... 250/560; 356/386
[58] Field of Search ............. 250/221, 222.1, 560, 250/561; 356/386, 387, 380

[56] References Cited

U.S. PATENT DOCUMENTS

| | | | |
|---|---|---|---|
| 3,484,615 | 12/1969 | Novo et al. | 356/386 |
| 3,744,915 | 7/1973 | Sick | 356/386 |
| 3,997,269 | 12/1976 | Moulton | 250/560 |
| 4,351,437 | 9/1982 | Long | 250/560 |
| 4,402,609 | 9/1983 | Fetzer et al. | 356/387 |
| 4,432,648 | 2/1984 | Musto et al. | 356/386 |
| 4,555,633 | 11/1985 | Bjövkelund | 250/560 |

Primary Examiner—David C. Nelms
Assistant Examiner—William L. Oen
Attorney, Agent, or Firm—Bryan Davis

[57] ABSTRACT

A laser beam fanned into a triangular plane configuration by mirrors, succeeding additional mirrors focusing the laser curtain rays back onto a spot, the spot having a light detecting, electrical transmitting element such that a square wave pulse is generated as the laser timely sweeps the collecting mirror, a breach in the square wave occurring when the laser ray curtain is penetrated breaking a laser beam, thus said penetration being detected, a system of three laser curtains in X, Y, and Z coordinates, having means of traversing an object to be measured, determining the exterior of each of its six sides.

19 Claims, 1 Drawing Sheet

U.S. Patent     Aug. 8, 1989     4,855,608
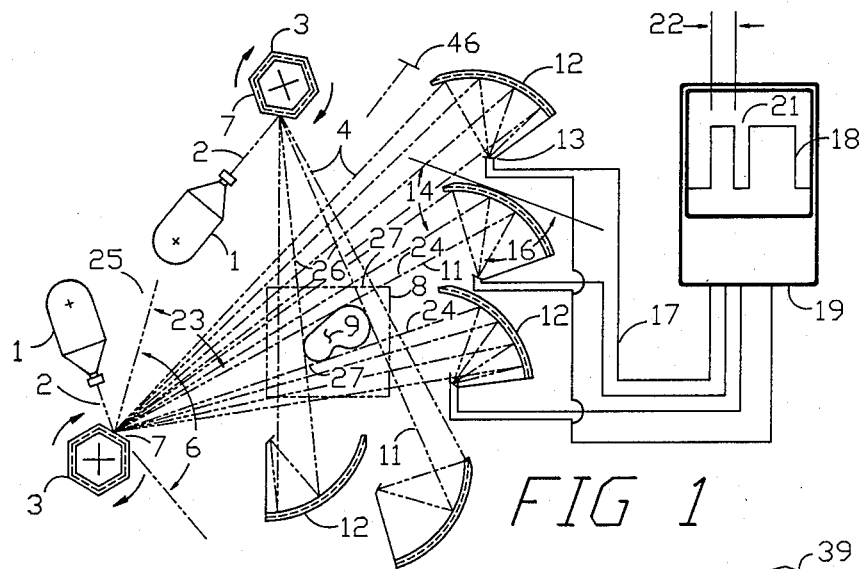
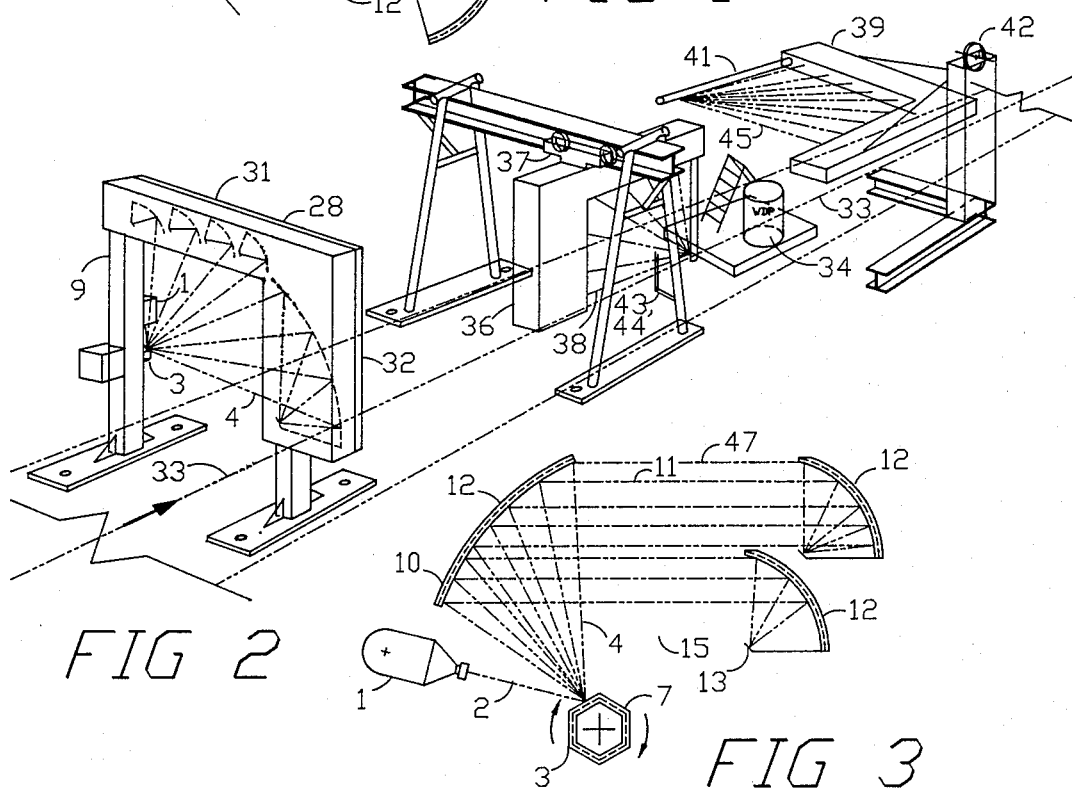

LASER CURTAIN HAVING AN ARRAY OF PARABOLIC MIRRORS EACH FOCUSING RADIATION ON A CORRESPONDING DETECTOR POSITIONED IN MIRROR'S FOCAL POINT

BACKGROUND OF THE INVENTION

To ship items on a pallet and to wrap and secure the items to the pallet before shipping, the items first need to be measured in size. Measuring with a hand tape has progressed into more automated methods using light beams and sonic devices. These are methods of single beam single detection devices or light beam or sound out, traveling singularly to the object being measured and then received singularly back by a compatible receiver.

BRIEF DESCRIPTION OF THE INVENTION

The invention is a laser beam fanned into a triangular plane configuration by a rotating mirror arrangement with succeeding additional mirrors focusing the laser rays curtain formed back onto a spot. The spot has a light detecting, electrical transmitting element such that a square wave pulse is generated as the laser timely sweeps the collection mirror. A breach in the square wave occurs when the laser ray curtain is penetrated by an object breaking a laser beam. A system of three laser spots curtains in X, Y, and Z coordinates, has means of traversing an object to be measured, determining the exterior of each of its six sides.

BRIEF DESCRIPTION OF THE DRAWINGS

FIG. 1 is a schematic illustration of a measuring apparatus of the invention;

FIG. 2 is a schematic illustration of an alternative embodiment of a measuring apparatus of the invention; and FIG. 3 is a schematic illustration of another alternative embodiment of a measuring apparatus of the invention.

DETAILED DESCRIPTION OF THE ILLUSTRATED EMBODIMENTS

The drawing shows in FIG. 1 a description of the laser path, how the laser beam is reflected off the rotating mirrored crystal of six sides, the beams coming off within a 120 degree arc, the beams further being deflected by curved mirrors back onto spots having photo-diodes which when acted upon by the laser rays cause electrical current which appears as square wave on an oscilloscope. FIG. 1 further shows two intersecting co-planar systems which can measure location of penetration by triangulation. FIG. 2 shows a frame striatal a conveyor with the laser system mounted therein, which measures an object's length as it is carried by the conveyor. FIG. 2 also shows other configurations of laser curtain systems in frame assembles in series which move across objects with the conveyor stopped, measuring objects' width and height. FIG. 3 shows a system with mirrors in parallel having parallel beams for penetration detection.

A laser 1 produces a single continuous beam 2 of high intensity collimated light. In the invention a laser beam 2 is aimed at a rotating mirror crystal 3. The crystal mirror 3 has shaped sides 7 such that as it rotates in time it deflects the laser 1 beam 2 into a triangular fan dispersion shape laser plane 4 the beam 2 from the laser 1 being normal (perpendicular to) the plane 4 formed. The included angle 6 of the formed plane 4 is related to the number of sides 7 of the rotating crystal 3. With the mirror 3 rotation axis crosswise to the laser 1 beam 2, a properly aligned crystal mirror 3 generates an included angle 6 in some systems equal to 720 degrees divided by the number of reflective surfaces 7. In other words, a crystal 3 of 8 sides 7 produces and interior angle 6 of 90 degrees, 6 sides—120 degrees, 4 sides—180 degrees.

There are other configurations to produce a plane 4 including a singular mirror 3 angled at 45 degrees with its rotation axis coincident to the laser 1 beam 2 axis which produces a full 360 degrees arc angle 6.

With the arc angle 6 formed, a detection zone 8 is surmised within the laser plane 4 triangle. The number of crystal sides 7 times the crystal 3 rotation speed indicates the number of detection zone sweeps in time. For example, 250 RPM×6 sides 7 would provide 1500 sweeps per minute. The more often and faster sweeping minimizes errors in measuring a transient object 9 as it breaks the screen 4 at some velocity. This will be understood better when the full scope of functions are grasp upon further reading herein.

With the triangular laser 1 plane 4 generated the invention further has means for collecting the dispersed laser 1 rays 11 using a succeeding curved receiving mirror 12 or system of mirrors 12 to focus the dispersed rays 11 back onto a minimum number of receiving spots 13, preferably one. A mirror 12 of somewhat parabolic structure is constructed such that the angle of incidence 14 is equal to the angle of reflection 16, the beam ray 11 coming from the crystal 3 reflecting off the receiving mirror 12 then onto the common collection spot 13. The mirror can be large having an extending mirrored surface 10 or be made up of a multitude of receiving mirrors 12, even many small flat mirrors.

Note: technically the beam ray 11 point of origin from the crystal 3 varies with rotation due to the change in crystal 3 mirror 7 plane position so actually a fixed point source only occurs with the coincident angular axis single 360 degrees mirror 7 plane drive system.

Laser beam ray 11 collection can be accomplished with many singular mirrors 12, even succeeding mirrors 12 in parallel with each other. Such combinations 15 of mirrors makes possible the projection of parallel beams rays 11 for achieving penetration detection and analysis. Also note that because a single mirror can be quite large, it become apparent that a multitude of curved mirrors 12 detector systems is of some advantage to simplify a mirror 12 support structure 28 and minimize fabrication tolerances.

At the spot 13 of the laser beam ray 11 re-convergence, a light detecting, electrical transmitting element (photo-diode) 13 is mounted. As the laser beam ray 11 sweeps the arc angle 6 the electrical element 13 transmits electrical energy 17 which appears as a continuous square wave 18 on an oscilloscope 19 as if the laser beam ray 11 were continuously impacting on the electrical element 13 (without its separation and reconvergence). With the laser beams ray 11 having the dispersion angle 6 being generated accordingly in time a breach of the laser curtain plane 4 by a penetrating object 9 causes a gap 21 in the square wave 18 of electrical generation 17 as viewed on the oscilloscope 19. With means for the measurement of time 22 into the square wave 18 relating to the angular laser ray 23 arc, the individual rays 24 can thus be determined providing line location of penetration. Now using a pair 25 of systems co-planer to each other, knowing which beams 24, 26 in each system are breached establishes points 27.

Thus, a singular source 1 system of singular reflection 12 back to a common spot 13 establishes a triangular curtain ray detection system 4. A singular source 1 system with additional series mirrors 15 per laser beam segment 11 back to a common spot 13 can establish a parallel ray curtain detection system 15 ideal for establishing height etc. A double or multiple source co-planer laser curtain ray system 25 is usable to establish point 27 location penetration detection and thus general shape of a curtain 4 penetrating object 9.

Having an inverted U shaped frame 28, with the rotating crystal 3 mounted at the bottom of one leg 29 the laser 1 is mounted somewhat above with its beam 2 properly aimed at the crystal mirror 7. Laser beams rays 11 reflect from the crystal mirror 7 to the two other sides of the frame 31, 32. Mirror systems 12 each having detecting elements 13 are mounted on these other frame sides 31, 32. Now, with such a laser assembly structure 28 mounted over a conveyor 33 objects 34 moving on the conveyor 33 penetrate the curtain 4 and exit the curtain 4 according to the velocity of the conveyor 33 and the length of the carried objects 34. Knowing the velocity of the conveyor 33, the length of the object 34 on the conveyor 33 is thus equal to the conveyor 33 distance traveled during the breach of the square wave 18 generation. Irregular shaped objects 9, 34 such as empty boxes and hollow frames will cause irregular outputs 18 which are viewed as just another variation from the full square wave; and, these objects present on the conveyor 33 are of course measured.

With the conveyor 33 being stopped, a vertically mounted laser curtain assembly 36 mounted on a transverse operating trolley 37 can move its laser curtain 38 to sweep over objects 34 to be analyzed at a right angle or 90 degrees to the direction of the conveyor 33 travel, the velocity of the support trolley 37 carrying the curtain assembly 38 now establishing the width of the object 34 being measured in the same way as length was determined, the difference being in the first case for length the object 34 was carried through the laser curtain frame 28 at a known speed on the conveyor 33 and in the second case for width the laser curtain 36 was carried over the object 34 at a known speed of the trolley 37.

In a similar procedure, with a laser curtain 45 assembly mounted horizontal 39, and with the conveyor 33 stopped, and with the object 34 being in the interior projection of the U frame 41, the frame 41 is raised on a trolley sweeping over the object 34 to be analyzed until the object 34 is no longer detected, thus determining its height size and or shape via the electrical output of the photo-diode 13. Again measurement of height is accomplished by knowing distance traveled at known travel speed. In this apparatus of measuring height and width, another method of measuring size is determining the trolley travel distance using an encoder 42, its rotation signaling position and distance of travel. An encoder 42 is a good alternative for use instead of trolley 37 speed which may vary due to curtain system acceleration and deceleration considerations. Screen travel stops and restart positions are controlled by curtain 4,38 assembly penetration of intentionally positioned detectable markers 43 or with limit switches 44. Laser angular sweep timing initiates from the initial constant starting position of square wave generation which intentionally begins outside of the detection zone; or else, a separate electronic light detecting element 46 is used for just this purpose.

Note: for best accuracy of measurement objects passing through cubesizer frames 28 and having cubesizer frames 36,39 passing over should be square with each other.

Variations from square like velocity will affect tolerances of measurements made. Note also that correctly positioned out of square frames will actually somewhat compensate for conveyor or trolley caused velocity error. In any way, for square measurements, the three cubesizing frames must need to be mounted somewhat square to each other and the flow of traffic.

With three different screen mountings 28,36,39, each for one of three axes of measurement, the three units are mounted in series over a conveyor 33 for measuring the cube size of an object 34 traveling on the conveyor 33 moving through the detection windows of the analyzers. Note that the conveyor 33 must stop for the width and height measurements as the cubsizer curtains or screens 38,45 pass over the conveyed object 34 whereas for length the conveyed object 34 passes through the laser curtain frame 28. More complicated systems use multiple mirrored systems 15 having parallel laser rays 47. Parallel ray systems 47 in pairs or multi systems are used for locating point penetration in coordinates; and thus, with individual beam analyzing and with proper computer software, height and width measurements are made without conveyor 33 stoppage.

I claim:

1. A measuring apparatus comprising: a laser curtain assembly, including:
    a light source which produces a high intensity collimated beam;
    a crystal mounted with respect to said light source and having planar surfaces in the path of said collimated beam to reflect said beam in a planar beam dispersion upon rotation of said crystal and to sweep said beam across an object to be measured,
    a collection mirror mounted away from said rotating crystal and with respect to said crystal such that such an object to be measured is in the optical pathway of said beam before reaching said collection mirror, said collection mirror being formed and adapted to reflect said beam to a focal point,
    a photodetector mounted with respect to said collection mirror to be at said focal point; and
    electronic measuring means linked with said photodetector for determining dimensions of said object by analysis of electronic pulses generated by said photodetector when said beam is received at said photodetector as compared to when said beam is blocked by an object to be measured.

2. A measuring apparatus according to claim 1 wherein said laser curtain assembly includes a plurality of said collection mirrors.

3. A measuring apparatus according to claim 1 wherein said planar beam dispersion is a triangular fan dispersion.

4. A measuring apparatus according to claim 3 further comprising an additional concave mirror mounted with respect to said crystal to redirect said triangular beam dispersion to a parallel-ray beam dispersion across said object to be measured.

5. A measuring apparatus according to claim 1 further comprising a plurality of said laser curtain assemblies mounted with respect to each other to produce separate and coplanar beam dispersions to provide additional pulse information to said electronic measuring means whereby said electronic measuring means may compute additional dimension and position information about an object to be measured.

6. A measuring apparatus according to claim 1 wherein a said laser curtain assembly is configured to produce a vertical planar beam dispersion, and further comprising a conveyor mounted with respect to said laser curtain assembly to move an object through said vertical planar beam dispersion in a direction generally perpendicular to the plane of said vertical planar beam dispersion.

7. A measuring apparatus according to claim 1 wherein said laser curtain assembly is mounted on a trolley to produce a vertical planar beam dispersion, said trolley being adapted to move said vertical planar beam dispersion in a direction generally perpendicular to its own plane across an object to be measured.

8. A measuring apparatus accoding to claim 1 wherein said laser curtain assembly is mounted on a trolley to produce a horizontal planar beam dispersion, said trolley being adapted to move said horizontal planar beam dispersion across an object to be measured in a direction perpendicular to its own plane.

9. A measuring apparatus according to claim 1 further comprising a plurality of said laser curtain assemblies mounted with respect to each other to produce a respective plurality of said planar beam dispersions, each of said planar beam dispersions being in a plane perpendicular to each of the other of said planar beam dispersions.

10. A measuring apparatus according to claim 9 wherein there are three of said mutually orthogonal planar beam dispersions to identify the length, width, and height of an object to be measured.

11. A measuring apparatus, comprising: a laser curtain assembly, including:
   a laser source adapted to produce a laser beam,
      a polygonal-shaped rotating crystal mounted with respect to said laser source to rotate and reflect said laser beam through a planar beam dispersion,
      a concave collection mirror mounted with respect to said crystal to reflect said laser beam received from said crystal to a focal point, said collection mirror being positioned with respect to an object to be measured such that an object is in the optical pathway of said beam between said crystal and said collection mirror,
      a photodetector mounted with respect to said collection mirror to receive and detect beams reflected from said collection mirror; and
   electronic measuring means electronically linked with said photodetector for determining the dimensions of an object by analysis of electronic pulses generated by said photodetector when said beam is received from said collection mirror as compared to when said beam is blocked by an object.

12. A measuring apparatus according to claim 11 further comprising a plurality of said laser curtain assemblies mounted with respect to each other to produce a plurality of said planar beam dispersions.

13. A measuring apparatus according to claim 11 wherein each of said plurality of beam dispersions are coplanar.

14. A measuring apparatus according to claim 12 wherein each of said planar beam dispersions are orthogonal to each of the other of said planar beam dispersions.

15. A measuring apparatus according to claim 14 wherein there are three of said planar beam dispersions to produce pulse information corresponding to the length, width and height of an object to be measured.

16. A measuring apparatus according to claim 15 further comprising:
   a first laser curtain assembly adapted to provide a first vertical planar beam dispersion, and a conveyor being adapted to transport an object to be measured in a direction to produce pulses corresponding to the length of an object;
   a second laser curtain assembly mounted upon a vertical trolley to produce a second vertical planar beam dispersion, said trolley being adapted to move said second planar beam dispersion in a direction to produce pulses corresponding to the width of an object; and
   a third laser curtain assembly mounted upon a horizontal trolley to produce a third horizontal planar beam dispersion, said horizontal trolley being adapted to move said third horizontal beam dispersion in a direction to produce pulses corresponding to the height of an object.

17. A measuring apparatus according to claim 11 wherein said laser curtain assembly further comprises an additional concave mirror mounted with respect to said crystal to direct said planar beam dispersions into a parallel-ray planar beam dispersion to be swept across an object to be measured before reaching said collection mirror.

18. A measuring apparatus according to claim 17 wherein there are a plurality said laser curtain assemblies to produce a respective plurality of parallel-ray beam dispersions wherein each of said plurality of parallel-ray beam dispersions has beams which are non-parallel to the beams of the other of said parallel beam dispersions.

19. A measuring apparatus according to claim 18 wherein the respective parallel rays of each parallel-ray beam dispersions are perpendicular to parallel rays of each of the other of said parallel beam dispersions.

* * * * *